US012607818B2

(12) United States Patent
Yamanaka

(10) Patent No.: US 12,607,818 B2
(45) Date of Patent: Apr. 21, 2026

(54) LENS AND LENS UNIT

(71) Applicant: HOYA CORPORATION, Tokyo (JP)

(72) Inventor: Kenji Yamanaka, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 309 days.

(21) Appl. No.: 18/235,049

(22) Filed: Aug. 17, 2023

(65) Prior Publication Data

US 2024/0069301 A1     Feb. 29, 2024

(30) Foreign Application Priority Data

Aug. 29, 2022     (JP) ................................. 2022-135616
Apr. 3, 2023     (JP) ................................. 2023-060060

(51) Int. Cl.
*G02B 7/02*          (2021.01)

(52) U.S. Cl.
CPC ...................................... *G02B 7/02* (2013.01)

(58) Field of Classification Search
CPC . C03B 11/08; C03B 2215/79; C03B 2215/49; C03B 2215/60; C03B 11/02; C03B 2215/46; C03B 2215/47; C03B 2215/65; C03B 2215/50; C03B 2215/61; C03B 11/06; C03B 11/00; C03B 23/00; G02B 7/02; G02B 7/022; G02B 7/023; G02B 7/026; G02B 1/041; B29D 11/00009; B29D 359/811; B29D 359/819; B29D 359/642; B29D 359/808; B29D 65/305
See application file for complete search history.

(56) References Cited

U.S. PATENT DOCUMENTS

| | | | | |
|---|---|---|---|---|
| 7,362,519 B2 * | 4/2008 | Sakaki | ................. | G02B 13/006 |
| | | | | 359/813 |
| 2001/0053032 A1 * | 12/2001 | Hatakeyama | ............ | G02B 7/02 |
| | | | | 359/811 |
| 2004/0187522 A1 * | 9/2004 | Kikuchi | ................. | C03B 11/08 |
| | | | | 65/39 |
| 2009/0029117 A1 * | 1/2009 | Aoi | .......................... | G02B 3/00 |
| | | | | 428/192 |

FOREIGN PATENT DOCUMENTS

| | | | | | |
|---|---|---|---|---|---|
| CN | 101177032 B | * | 11/2012 | .............. | G02B 3/00 |
| JP | 3-167514 A | | 7/1991 | | |

(Continued)

*Primary Examiner* — Matthew Y Lee

(74) *Attorney, Agent, or Firm* — Greenblum & Bernstein, P.L.C.

(57)          ABSTRACT

A lens includes: an optical-functioning portion that is a glass press-molded product and has both lens surfaces in an optical axis direction and a volume absorption portion allowing a shape error due to press-molding around the lens surfaces; and a flange portion made of a material different from the glass of the optical-functioning portion, fixed to the optical-functioning portion to surround the volume absorption portion, and having a position reference surface serving as a reference of a lens position. An outer diameter D in an orthogonal direction to the optical axis defined by the flange portion and a thickness t of the flange portion satisfy the following condition (1) or (2).

when 2 mm$\leq$D$\leq$5 mm, 0.15$\leq$t$\leq$0.35          (1)

when D>5 mm, 0.15+(D–5)×0.03$\leq$t$\leq$0.15+(D–5)× 0.07          (2)

12 Claims, 8 Drawing Sheets

(56)                  References Cited

FOREIGN PATENT DOCUMENTS

| JP | H06144853 A | * | 5/1994 | ............ C03B 11/08 |
| JP | 3679489 B2 | | 8/2005 | |
| JP | 2008-88027 A | | 4/2008 | |
| JP | 2008197282 A | * | 8/2008 | ............ G02B 7/022 |
| JP | 2013-14455 A | | 1/2013 | |
| JP | 2018-116102 A | | 7/2018 | |

* cited by examiner

LENS AND LENS UNIT

BACKGROUND OF THE INVENTION

1. Technical Field

The present invention relates to a lens and a lens unit.

2. Description of the Related Art

In recent years, mounting of an imaging means on a portable electronic device such as a smartphone has been widely used, and there is an increasing demand for a compact and high-performance imaging means. There is a demand for a lens constituting the imaging means which is as small and lightweight as possible while the lens satisfies high optical performance, positioning with high accuracy at the holding member that holds the lens, and the like.

In general, a lens has an annular flange portion on a circumferential edge of an optically functioning main body region having a lens surface, and a position of the lens is determined by fixing the flange portion to a holding member. The position of the lens is determined by a position in an optical axis direction, a position in a direction perpendicular to the optical axis (hereinafter, referred to as an orthogonal direction to the optical axis), and an inclination with respect to the optical axis of an optical system. For example, the flange portion has a flat surface perpendicular to the optical axis on at least one of front and rear sides in the optical axis direction, and a lens position in the optical axis direction is determined with this flat surface as a reference. In addition, the flange portion has a cylindrical outer circumferential surface surrounding the optical axis, and the lens position in the orthogonal direction to the optical axis may be determined based with the outer circumferential surface as a reference.

As another example of positioning a lens, a flange portion has a tapered surface that is neither parallel nor perpendicular to the optical axis, and a position in the optical axis direction and a position in an orthogonal direction to the optical axis are collectively controlled based on the tapered surface.

In order to reduce a size and a weight of the lens, it is desired to decrease a thickness of a flange portion in the optical axis direction. However, due to the following reasons, a degree of freedom of a shape and a structure of the flange portion in a glass lens is limited, and it has been difficult to sufficiently decrease the thickness of the flange portion.

In a glass mold lens manufactured by press-molding a glass preform in a molding die, a volume absorption portion is set at a flange portion in order to absorb various errors related to a quantity and a supply position of the glass preform, a volume of an internal space (die space) of a molding die, and the like. The volume absorption portion is a region that allows variations in shape depending on the various errors described above and is often set as a rounded corner shape (corner-R shape) curved at a corner region of the flange portion. Accordingly, at a lower limit of the varying die space volume and at an upper limit of a volume of the glass preform, that is, when the volume of the glass preform has the smallest clearance with respect to the die space volume, a corner-R value of the volume absorption portion is set to an allowable minimum value, and the corner-R value of the volume absorption portion is set such that design is performed based on a median value of vertical variations of the volume.

Since the volume absorption portion is a region that allows variations in shape, a region of the volume absorption portion in the flange portion cannot be used for positioning a lens with respect to a holding member. When an area used for positioning the lens is not sufficiently secured in the flange portion, the positional accuracy of the lens and the stability of the lens deteriorate. Hence, the flange portion needs to have a dimension enabling highly accurate positioning to be realized and, further, add a dimension of the volume absorption portion that performs error absorption at the time of molding, and a reduction in size of the flange portion has been restricted.

In addition, a problem arises in that the glass mold lens is likely to crack and break at a region having a small thickness and a steep angle change. Therefore, the strength of the flange portion itself needs to be secured, so that a decrease in thickness of the flange portion is restricted.

When there is a narrow space in the molding die at the time of molding the glass mold lens, it is difficult to spread a glass preform, so that it is necessary to increase a temperature for reducing the viscosity of the glass preform. Therefore, in order to form a thin flange portion, the glass preform is heated to a temperature higher than a temperature required for forming a lens surface, and there is a possibility that accuracy and appearance quality of the lens surface will deteriorate.

Hence, there is a limit to a decrease in thickness of the flange portion of the glass mold lens, and a solution thereof has been demanded. For example, Japanese Laid-Open Patent Publication No. H03-167514, Japanese Patent No. 3679489, and Japanese Laid-Open Patent Publication No. 2008-88027 describe technologies that include a frame member (holder) made of another material such as metal provided at an outer circumferential region of a glass mold lens to mold the lens and integrate the lens with the frame member by press-molding. The lens can be positioned using the frame member.

SUMMARY OF THE INVENTION

In the invention described in Japanese Laid-Open Patent Publication No. H03-167514 a glass mold lens has a flange portion having a flat surface perpendicular to the optical axis on an outer side of an aspherical lens surface of a glass mold lens, and a metal frame member is provided on an outer side of the flange portion. Therefore, it has not been possible to solve the above-described problem that it is difficult to decrease the thickness of the flange portion due to the manufacturing restriction of the glass mold lens.

In addition, in the related art in which the frame member is provided on the outer circumferential side of the glass mold lens as in Japanese Laid-Open Patent Publication No. H03-167514, Japanese Patent No. 3679489, and Japanese Laid-Open Patent Publication No. 2008-88027, a specific condition for realizing miniaturization (thinning) of a lens holding region without impairing the optical performance has not been presented with respect to a dimensional relationship of the glass mold lens and the frame member.

The invention has been made based on the above problem, and provides a lens and a lens unit that enable a lens holding region to have a small size while securing optical performance.

A lens of an aspect of the invention includes: an optical-functioning portion that is a press-molded product made of glass, has lens surfaces on both sides in an optical axis direction, and has a volume absorption portion that allows a shape error due to press-molding around the lens surfaces; and a flange portion made of a material different from the glass of the optical-functioning portion, fixed to an outer circumferential surface of the optical-functioning portion to surround an outer side of the volume absorption portion, and having a position reference surface serving as a reference of a lens position. An outer diameter D in an orthogonal direction to the optical axis defined by an outer circumferential surface of the flange portion and a thickness t in the optical axis direction of the flange portion satisfy the following condition (1) or (2).

$$\text{when } 2 \text{ mm} \leq D \leq 5 \text{ mm}, 0.15 \leq t \leq 0.35 \tag{1}$$

$$\text{when } D > 5 \text{ mm}, 0.15 + (D-5) \times 0.03 \leq t \leq 0.15 + (D-5) \times 0.07 \tag{2}$$

The flange portion is preferably made of metal.

The position reference surface is preferably a flat surface perpendicular to the optical axis.

According to one aspect of the lens, the volume absorption portion is positioned between the lens surfaces of the optical-functioning portion and the outer circumferential surface of the optical-functioning portion in the orthogonal direction to the optical axis.

According to another aspect of the lens, the volume absorption portion is provided on the outer circumferential surface of the optical-functioning portion, and the flange portion has a recessed portion capable of accommodating the volume absorption portion in an inner circumferential portion.

Preferably, the flange portion has an inner circumferential surface which is subjected to a blackening treatment, the inner circumferential surface being fixed to the outer circumferential surface of the optical-functioning portion.

The flange portion may have an outer surface which is entirely subjected to a blackening treatment.

Preferably, the upper limit value of the thickness t of the flange portion is 40% or less of the outer diameter D.

Preferably, a surface diameter d of the optical-functioning portion defined by an inner circumferential surface of the flange portion, and an effective diameter e that is a diameter of a region of the optical-functioning portion excluding a radial region where the volume absorption portion is formed satisfy any one of the following conditions (3), (4), (5), and (6).

$$(d-e) \leq 0.5 \text{ mm when } 2 \text{ mm} \leq e \leq 5 \text{ mm} \tag{3}$$

$$(d-e) \leq 0.7 \text{ mm when } 5 \text{ mm} < e \leq 10 \text{ mm} \tag{4}$$

$$(d-e) \leq 0.9 \text{ mm when } 10 \text{ mm} < e \leq 15 \text{ mm} \tag{5}$$

$$(d-e) \leq 1.1 \text{ mm when } 15 \text{ mm} < e \leq 20 \text{ mm} \tag{6}$$

Preferably, an error absorption width R that is a dimension of the radial region in the orthogonal direction to the optical axis where the volume absorption portion is formed, and the outer diameter D satisfy any one of the following conditions (7), (8), (9), and (10).

$$R \leq 0.23 \text{ mm when } 2 \text{ mm} \leq D \leq 5 \text{ mm} \tag{7}$$

$$R \leq 0.35 \text{ mm when } 5 \text{ mm} < D \leq 10 \text{ mm} \tag{8}$$

$$R \leq 0.45 \text{ mm when } 10 \text{ mm} < D \leq 15 \text{ mm} \tag{9}$$

$$R \leq 0.55 \text{ mm when } 15 \text{ mm} < D \leq 20 \text{ mm} \tag{10}$$

Preferably, the outer diameter D, the thickness t of the flange portion and a surface diameter d of the optical-functioning portion defined by an inner circumferential surface of the flange portion satisfy the following condition (11).

$$0.5 \leq \{(D-d)/2\}/t \leq 30 \tag{11}$$

A lens unit of another aspect of the invention includes a lens barrel into which the lens is insertable. The lens is positioned in the lens barrel by abutment of the position reference surface of the lens on a position restricting surface in the lens barrel.

According to the invention, it is possible to obtain a lens and a lens unit in which a lens is configured to include an optical-functioning portion having lens surfaces and a volume absorption portion and a flange portion having a position reference surface, and a predetermined condition is satisfied with respect to a lens outer diameter and a thickness of the flange portion, so that a lens holding region can be decreased in size while securing optical performance.

The present disclosure relates to subject matter contained in Japanese Patent Application No. 2022-135616 (filed on Aug. 29, 2022) and Japanese Patent Application No. 2023-060060 (filed on Apr. 3, 2023) which are expressly incorporated herein by reference in its entirety.

DESCRIPTION OF THE EMBODIMENTS

Figure 1:
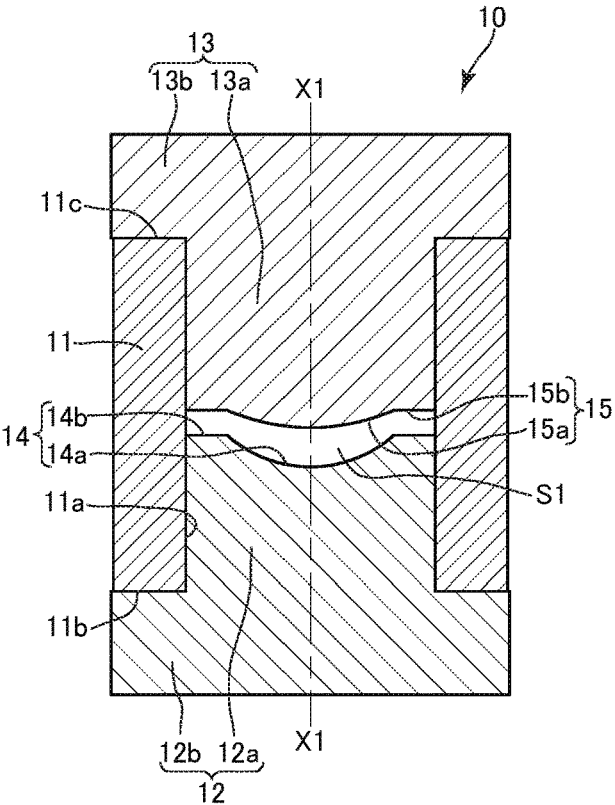
FIG. 1 is a view illustrating a molding die for press-molding a glass mold lens in the related art.
Figure 2:
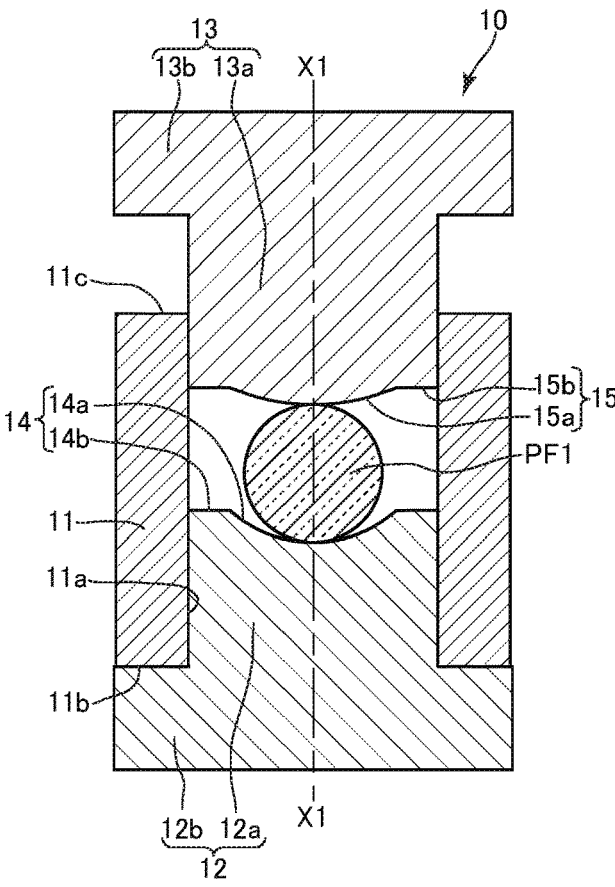
FIG. 2 is a view illustrating a state before the glass mold lens is press-molded in the related art.
Figure 3:
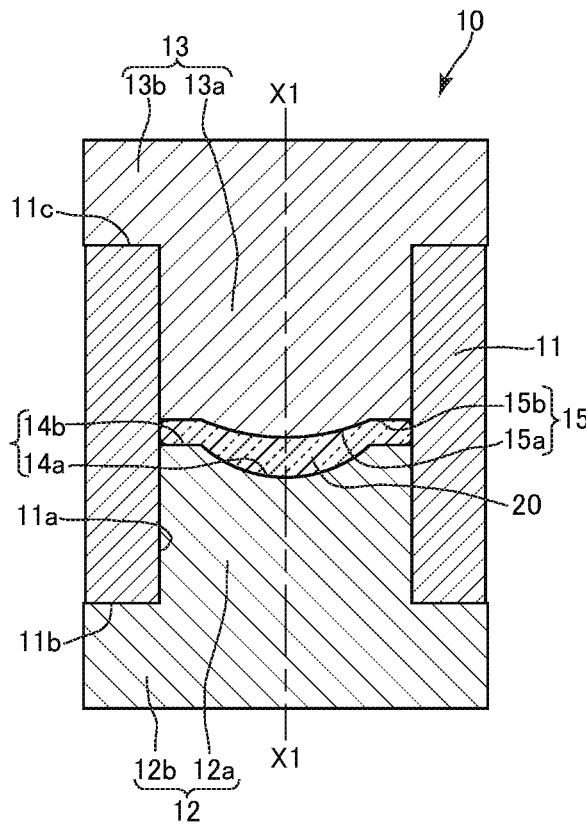
FIG. 3 is a view illustrating a state in which the glass mold lens has been press-molded in the related art.
Figure 4:
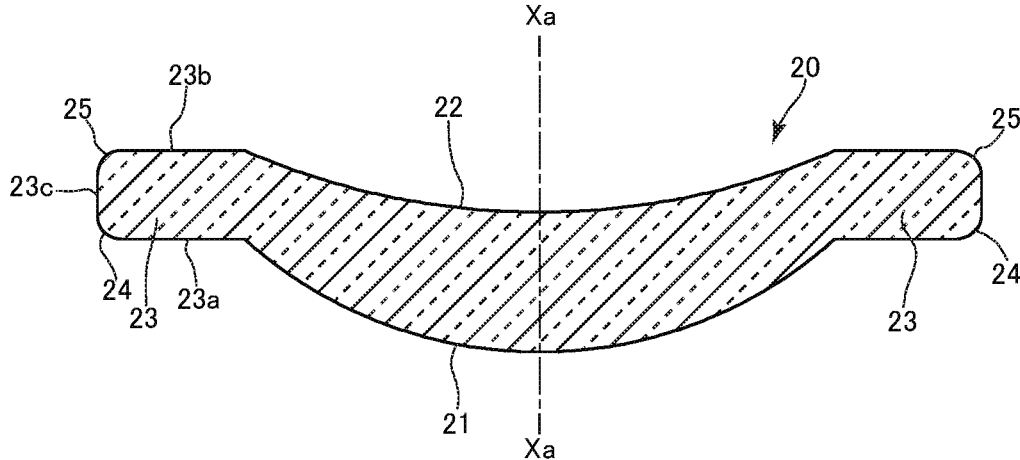
FIG. 4 is a cross-sectional view of a glass mold lens in the related art.

First, a glass mold lens and a manufacture thereof in the related art will be described with reference to FIGS. 1 to 4. FIGS. 1 to 3 illustrate a configuration and an operation of a molding die 10 for manufacturing a glass mold lens 20, and FIG. 4 illustrates the glass mold lens 20 formed by the molding die 10.

The molding die 10 is configured to include a barrel die 11, a lower die 12, and an upper die 13. The barrel die 11 has a cylindrical shape and has an internal space surrounded by an inner circumferential surface 11a which is a cylindrical surface. A central axis X1 of the molding die 10 is an axis line extending in a vertical direction through the center of the inner circumferential surface 11a. A lower end surface 11b and an upper end surface 11c of the barrel die 11 are surfaces perpendicular to the central axis X1. The internal space of the barrel die 11 vertically penetrates and is open to the lower end surface 11b and the upper end surface 11c.

The lower die 12 includes an insertion portion 12a inserted into the internal space of the barrel die 11 from below and a large-diameter portion 12b that is provided below the insertion portion 12a and has a larger diameter than the insertion portion 12a. The upper die 13 includes an insertion portion 13a that is inserted into the internal space of the barrel die 11 from above and a large-diameter portion 13b that is provided above the insertion portion 13a and has a larger diameter than the insertion portion 13a. Both outer circumferential surfaces of the insertion portion 12a and the insertion portion 13a can slide in the vertical direction with respect to the inner circumferential surface 11a of the barrel die 11, and movement thereof is restricted in a direction perpendicular to the central axis X1. That is, the lower die 12 and the upper die 13 are movable in the vertical direction with respect to the barrel die 11 in a state in which the centers of the lower die 12 and the upper die 13 are aligned to coincide with the central axis X1.

The lower die 12 has a press surface 14 at an upper end of the insertion portion 12a. The press surface 14 has a concave lens forming surface 14a and a flange forming surface 14b positioned around the lens forming surface 14a. The upper die 13 has a press surface 15 at a lower end of the insertion portion 13a. The press surface 15 has a convex lens forming surface 15a and a flange forming surface 15b positioned around the lens forming surface 15a.

The lower die 12 can be inserted into the barrel die 11 to a position at which the large-diameter portion 12b comes into contact with the lower end surface 11b. The upper die 13 can be inserted into the barrel die 11 to a position where the large-diameter portion 13b comes into contact with the upper end surface 11c. Both positions where the lower die 12 and the upper die 13 are inserted most into the barrel die 11 are referred to as respective press moving ends. As illustrated in FIG. 1, in a state in which the lower die 12 and the upper die 13 reach the respective press moving ends, the press surface 14 and the press surface 15 face each other at a predetermined interval in the vertical direction, and a die space S1 surrounded by the press surface 14, the press surface 15, and the inner circumferential surface 11a is formed.

When the glass mold lens 20 is molded using the molding die 10, as illustrated in FIG. 2, a spherical glass preform PF1 made of glass serving as a base material of the glass mold lens 20 is placed on the press surface 14 of the lower die 12. The glass preform PF1 is held at a position on the central axis X1 in a concave shape of the lens forming surface 14a. The lower die 12 is held at the press moving end where the large-diameter portion 12b is abutted on the lower end surface 11b, and the lower die 12 is supported from below so that the insertion portion 12a is not detached from the barrel die 11. The glass preform PF1 may be supplied onto the press surface 14 in a state in which the insertion portion 12a is pulled downward from the barrel die 11, or the glass preform may be supplied from an upper end side of the barrel die 11 in a state in which the insertion portion 12a is inserted into the barrel die 11.

The glass preform PF1 is heated and softened to have a temperature exceeding the glass transition temperature, and the upper die 13 in a state in which the insertion portion 13a is inserted into the barrel die 11 is pressed downward. The glass preform PF1 is pressed between the press surface 15 of the lowering upper die 13 and the press surface 14 of the lower die 12 which is restricted from lowering, and the glass preform PF1 is deformed.

When the upper die 13 is lowered to the press moving end illustrated in FIG. 3, the glass preform PF1 has a shape corresponding to the die space S1. Accordingly, by disassembling the molding die 10 after cooling to a predetermined temperature, the molded glass mold lens 20 can be taken out. The glass mold lens 20 is a lens to which surface shapes of the press surface 14, the press surface 15, and the inner circumferential surface 11a are transferred.

A direction along an optical axis Xa of the glass mold lens 20 is defined as an optical axis direction, and a direction perpendicular to the optical axis Xa is defined as an orthogonal direction to the optical axis. The orthogonal direction to the optical axis can also be referred to as a radial direction of the glass mold lens 20.

As illustrated in FIG. 4, the glass mold lens 20 includes, on both sides (front and back) in the optical axis direction, a convex lens surface 21 to which the surface shape of the lens forming surface 14a is transferred and a concave lens surface 22 to which the surface shape of the lens forming surface 15a is transferred. The glass mold lens 20 further includes an annular flange portion 23 around the lens surface 21 and the lens surface 22. The flange portion 23 is a portion surrounded by a first flat surface 23a to which the surface shape of a flange forming surface 14b is transferred, a second flat surface 23b to which the surface shape of the flange forming surface 15b is transferred, and an outer circumferential surface 23c to which the surface shape of the inner circumferential surface 11a of the barrel die 11 is transferred. The first flat surface 23a and the second flat surface 23b are flat surfaces perpendicular to the optical axis Xa, and the outer circumferential surface 23c is a cylindrical surface around the optical axis Xa.

When the glass mold lens 20 is manufactured using the molding die 10, various errors such as a quantity error of the glass preform PF1, a volume error of the die space S1 of the molding die 10, and deviation of the supply position of the glass preform PF1 occur. The glass mold lens 20 has a volume absorption portion 24 and a volume absorption portion 25 for absorbing effects of these errors at a corner portion of an outer circumference of the flange portion 23.

Specifically, the volume absorption portion 24 is formed by connecting the first flat surface 23a and the outer circumferential surface 23c to have a rounded corner shape (corner R shape) passing through an inner side of a corner shape (rectangular shape) formed when the first flat surface 23a and the outer circumferential surface 23c are extended as they are and intersect each other. The volume absorption portion 25 is formed by connecting the second flat surface 23b and the outer circumferential surface 23c to have a rounded corner shape (corner R shape) passing through an inner side of a corner shape (rectangular shape) formed when the second flat surface 23b and the outer circumferential surface 23c are extended as they are and intersect each other. The volume absorption portion 24 and the volume absorption portion 25 are regions that allow variations in shape due to the various errors described above. Hence, the shapes of the volume absorption portion 24 and the volume absorption portion 25 illustrated in FIG. 4 are an example, and the shapes of the volume absorption portion 24 and the volume absorption portion 25 vary depending on a degree of an error. Accordingly, the volume absorption portion 24 and the volume absorption portion 25 enable other regions of the glass mold lens 20 to be formed with high accuracy.

On the other hand, since the glass mold lens 20 cannot be accurately positioned in a lens barrel of a lens unit at positions of the volume absorption portion 24 and the volume absorption portion 25, the volume absorption portion 24 and the volume absorption portion 25 in the flange portion 23 result in a relatively small size of a surface of the flange portion 23, the surface serving as a reference for positioning the glass mold lens 20. For example, in a case where the flange portion 23 has a constant width in the orthogonal direction to the optical axis, widths of the first flat surface 23a and the second flat surface 23b in the orthogonal direction to the optical axis decrease, as formation ranges of the volume absorption portion 24 and the volume absorption portion 25 in the orthogonal direction to the optical axis increase. In a case where the glass mold lens 20 is positioned in the optical axis direction by using the first flat surface 23a and the second flat surface 23b, there is a possibility that positioning accuracy and holding stability will deteriorate in a case where the glass mold lens 20 is attached to the lens barrel of the lens unit, when the widths of the first flat surface 23a and the second flat surface 23b in the orthogonal direction to the optical axis are decreased. In addition, in a case where the flange portion 23 has a constant thickness in the optical axis direction, a length of the outer circumferential surface 23c in the optical axis direction decreases in the flange portion 23, as the formation ranges of the volume absorption portion 24 and the volume absorption portion 25 in the optical axis direction increase. In a case where the glass mold lens 20 is positioned in the orthogonal direction to the optical axis by using the outer circumferential surface 23c, there is a possibility that positioning accuracy and holding stability will deteriorate in a case where the glass mold lens 20 is attached to the lens barrel of the lens unit, when a length of the outer circumferential surface 23c in the optical axis direction is decreased.

Hence, the flange portion 23 needs to have sufficient dimensions for obtaining a positioning function and, further, needs to have dimensions for obtaining an error absorption function by the volume absorption portion 24 and the volume absorption portion 25, and thus a decrease in size of the flange portion 23 has been restricted. In other words, integration of the positioning function and the error absorption function at the time of molding into the flange portion 23 in the glass mold lens 20 is one factor that restricts the decrease in size of the flange portion 23.

In general, the glass mold lens is likely to crack and break at a region having a small thickness and a steep angle change. In the case of the glass mold lens 20 illustrated in FIG. 4, a boundary region between the convex lens surface 21 and the first flat surface 23a is the region where cracking or breakage is particularly likely to occur. Therefore, even if the flange portion 23 is thinned in the optical axis direction without being restricted by the volume absorption portion 24 and the volume absorption portion 25, there is a problem that a risk of cracking or breakage will increase as the thickness of the flange portion 23 decreases. Hence, in the glass mold lens 20, a decrease in size (particularly, decrease in thickness in the optical axis direction) of the flange portion 23 is also restricted from the viewpoint of securing the strength of the flange portion 23 itself.

In addition, when the glass mold lens is molded, it is necessary to pay attention to the fluidity of the glass preform in a space of the molding die. In the die space S1 of the molding die 10 illustrated in FIG. 1, a wide space is formed at a central region between the lens forming surface 14a and the lens forming surface 15a, and a narrow space is formed at a circumferential edge region between the flange forming surface 14b and the flange forming surface 15b.

In order to extend the glass preform PF1 in a narrow space of a circumferential edge of the die space S1 at the time of pressing, it is necessary to reduce the viscosity of the glass preform PF1. That is, in order to make the flange portion 23 thinner in the optical axis direction than an effective diameter region (range of the lens surface 21 and the lens surface 22) in the glass mold lens 20, it is necessary to extend the glass preform PF1 having a reduced viscosity in the narrow space of circumferential edge of the die space S1. Accordingly, in order to reduce the viscosity of a portion where the flange portion 23 is formed, it is necessary to increase the temperature of the glass preform PF1 to a temperature (for example, set as a second temperature) higher than a temperature (for example, set as a first temperature) suitable for extending a portion where the lens surface 21 and the lens surface 22 are formed. When the lens surface 21 and the lens surface 22 that can be formed at the first temperature are formed at the second temperature higher than the first temperature, an effect of thermal shrinkage increases after the molding, and there is a possibility that the accuracy and appearance quality of the lens surfaces 21 and 22 will deteriorate as compared with the case of forming the surfaces at the first temperature.

Moreover, as the flange portion 23 is thinned in the optical axis direction, the space for forming the flange portion 23 becomes narrower in the die space S1, and the glass preform PF1 is less likely to be extended, and it is necessary to further lower the viscosity of the glass preform PF1 at the time of molding (that is, to heat the glass preform PF1 to a high temperature). As a result, it becomes difficult to secure the accuracy and appearance quality of the lens surface 21 and the lens surface 22. That is, from the viewpoint of ensuring the quality of the effective diameter region (the region of the lens surface 21 or the lens surface 22) of the glass mold lens 20, a decrease in size (particularly, decrease in thickness in optical axis direction) of the flange portion 23 has been restricted.

In addition, in a case where the glass preform PF1 is extended to a portion of the flange portion 23 which is thin and easily cracks, a countermeasure is known in which a release film for suppressing cracking is provided or a surface treatment for making the glass preform PF1 difficult to crack is performed on the glass preform PF1. However, when the release film or the surface treatment for avoiding such a crack is applied, there is a problem that an outer surface of the glass mold lens 20 easily becomes opaque or the surface accuracy of the outer surface of the glass mold lens 20 becomes unstable.

When the glass mold lens 20 is molded by the molding die 10, and the upper die 13 is lowered and the glass preform PF1 is pressurized, an outer circumferential portion of the glass preform PF1 may be curved upward by the pressure applied to the glass preform PF1 from a top portion of the convex lens forming surface 15a of the upper die 13, and the outer circumferential portion of the glass preform PF1 may come into contact with the lens forming surface 15a earlier than a region on an inner circumferential side. Alternatively, the outer circumferential portion of the glass preform PF1 may be curved downward, and the outer circumferential portion of the glass preform PF1 may come into contact with the lens forming surface 14a earlier than the region on the inner circumferential side. In such a case, gas is enclosed between the glass preform PF1 and the lens forming surface 15a or between the glass preform PF1 and the lens forming surface 14a, and a so-called gas trap occurs. The gas trap causes a shape defect of the glass mold lens 20.

In order to avoid the gas trap, it is necessary to make the curvature radius of the glass preform PF1 smaller than the curvature radius of the lens forming surface 14a or the lens forming surface 15a of the molding die 10 by a predetermined value or more. However, in order to form the glass mold lens 20 including a volume of the flange portion 23, the necessary volume of the glass preform PF1 is increased, and it is difficult to set the curvature radius of the glass preform PF1 to be small. Accordingly, due to the various reasons described above, there is a limit to a decrease in size of the flange portion 23, and there is a limit to measures for reducing the amount of the glass preform PF1 to avoid the gas trap.

Unlike the glass mold lens 20 illustrated in FIG. 4, there is known a glass mold lens of a type in which a plurality of step shapes are provided at a flange portion and a positioning function portion and a volume absorption portion in the flange portion are divided. In addition, there is known a glass mold lens of a type in which a volume absorption portion having a shape protruding in the optical axis direction from a positioning function portion is provided at a flange portion. In each of these types of glass mold lenses, since the volume absorption portion or the positioning function portion become a bent flange portion having a complicated shape, it is disadvantageous in terms of strength, or it is difficult to mold the positioning function portion with high accuracy.

In view of various problems of the glass mold lens in the related art, as described above, an embodiment of the present invention provides a lens that enables a lens holding portion to be decreased in size (particularly, decreased in thickness in the optical axis direction) while securing optical performance. The embodiment of the present invention is based on the viewpoint that the above problems can be solved by configuring a lens with both an optical-functioning portion, which is made of a press-molded product of glass and has lens surfaces, and a flange portion which is made of a material different from the glass of the optical-functioning portion and is provided on an outer side of the optical-functioning portion, allowing the optical-functioning portion to has a minimum necessary configuration that satisfies an optical function and an error absorption function at the time of molding, and causing the flange portion to fulfill a lens positioning function.

Figure 5:
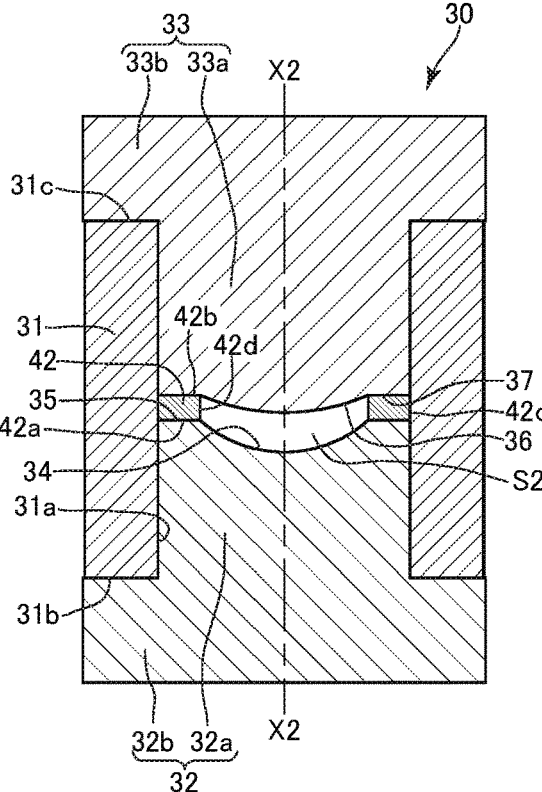
FIG. 5 is a view illustrating a state in which a flange portion is disposed in a molding die for press-molding a lens of an embodiment.
Figure 6:
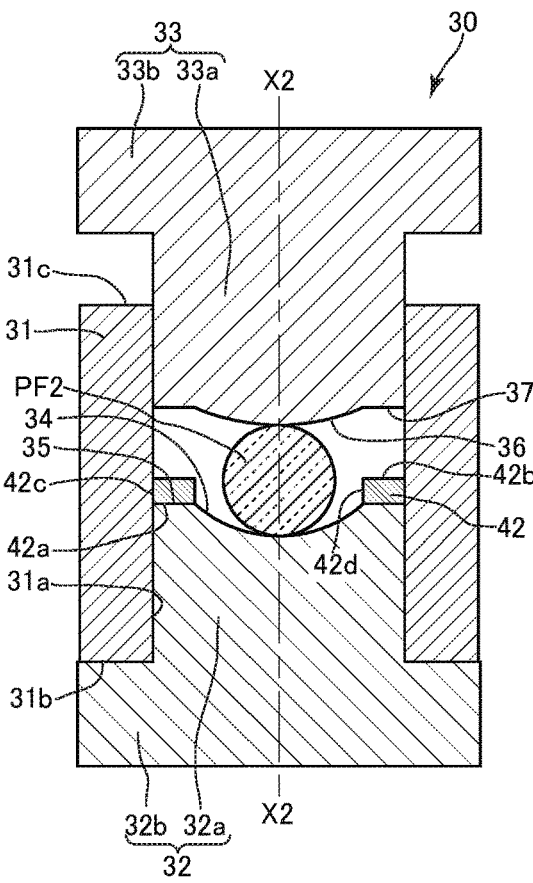
FIG. 6 is a view illustrating a state before press-molding of the lens of the embodiment.
Figure 7:
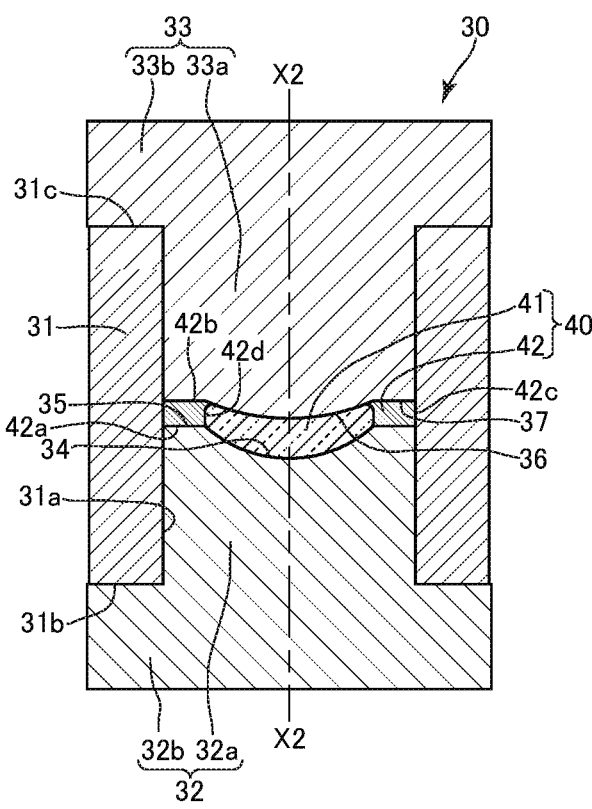
FIG. 7 is a view illustrating a state in which the lens of the embodiment is press-molded.
Figure 8:
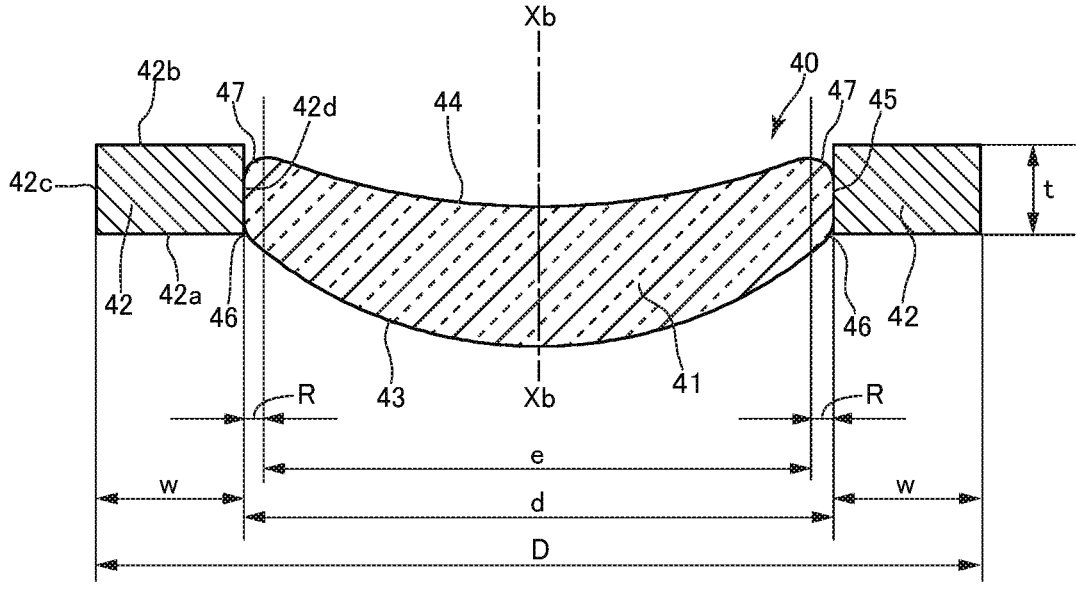
FIG. 8 is a cross-sectional view of the lens of the embodiment.
Figure 9:
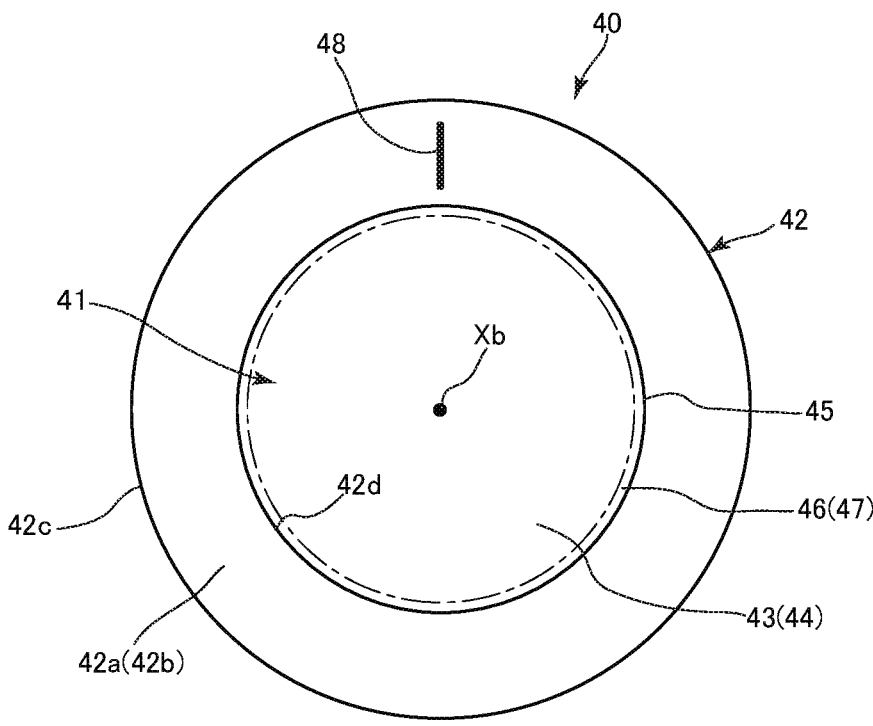
FIG. 9 is a front view of the lens of the embodiment.

Subsequently, a lens according to an embodiment to which the invention is applied and manufacturing of the lens will be described with reference to FIGS. 5 to 9. FIGS. 5 to 7 illustrate a configuration and an operation of a molding die 30 for manufacturing a lens 40 of the embodiment, and FIGS. 8 and 9 illustrate the lens 40 formed by the molding die 30.

The molding die 30 is configured to include a barrel die 31, a lower die 32, and an upper die 33. The barrel die 31 has a cylindrical shape and has an internal space surrounded by an inner circumferential surface 31a which is a cylindrical surface. A central axis X2 of the molding die 30 is an axis line extending in a vertical direction through the center of the inner circumferential surface 31a. The barrel die 31 has a barrel die lower end surface 31b at a lower end thereof and a barrel die upper end surface 31c at an upper end thereof. The barrel die lower end surface 31b and the barrel die upper end surface 31c are surfaces perpendicular to the central axis X2. The internal space of the barrel die 31 vertically penetrates and is open to the barrel die lower end surface 31b and the barrel die upper end surface 31c.

The lower die 32 includes an insertion portion 32a inserted into the internal space of the barrel die 31 from below and a large-diameter portion 32b that is provided below the insertion portion 32a and has a larger diameter than the insertion portion 32a. The upper die 33 includes an insertion portion 33a that is inserted into the internal space of the barrel die 31 from above and a large-diameter portion 33b that is provided above the insertion portion 33a and has a larger diameter than the insertion portion 33a. Both outer circumferential surfaces of the insertion portion 32a and the insertion portion 33a can slide in the vertical direction with respect to the inner circumferential surface 31a of the barrel die 31, and movement thereof is restricted in a direction perpendicular to the central axis X2. That is, the lower die 32 and the upper die 33 are movable in the vertical direction with respect to the barrel die 31 in a state in which the centers of the lower die 32 and the upper die 33 are aligned to coincide with the central axis X2.

The lower die 32 has a lens forming surface 34 at an upper end of the insertion portion 32a. The lens forming surface 34 is a concave surface that has a center on the central axis X2 which is the deepest and that becomes shallower toward the outer circumferential side. At the upper end of the insertion portion 32a, a flange portion holding surface 35 is further formed around the lens forming surface 34. The flange portion holding surface 35 is a surface perpendicular to the central axis X2 and is provided in an annular range around the central axis X2.

The upper die 33 has a lens forming surface 36 at a lower end of the insertion portion 33a. The lens forming surface 36 is a convex surface that has a center on the central axis X2 which protrudes downward the most, and an amount of downward protrusion is decreased toward the outer circumferential side. At the lower end of the insertion portion 33a, a flange portion holding surface 37 is further formed around the lens forming surface 36. The flange portion holding surface 37 is a surface perpendicular to the central axis X2 and is provided in an annular range around the central axis X2.

When the lens 40 is formed by press-molding, both positions where the insertion portion 32a of the lower die 32 and the insertion portion 33a of the upper die 33 are most inserted into the barrel die 31 is referred to as press moving ends of the lower die 32 and the upper die 33. As illustrated in FIG. 5, in a state in which the lower die 32 and the upper die 33 reach the respective press moving ends, the lens forming surface 34 and the lens forming surface 36 face each other with a predetermined interval in the vertical direction, and a die space S2 is formed between the lower die 32 and the upper die 33. The die space S2 is a space surrounded by the lens forming surface 34 and the flange portion holding surface 35 of the lower die 32, the lens forming surface 36 and the flange portion holding surface 37 of the upper die 33, and the inner circumferential surface 31a of the barrel die 31.

As an example, a position where the large-diameter portion 32b abuts on the barrel die lower end surface 31b can be defined as a press moving end of the lower die 32. In addition, a position where the large-diameter portion 33b abuts on the barrel die upper end surface 31c can be defined as a press moving end of the upper die 33. Alternatively, in the upper die 33, the press moving end may be determined by a configuration other than the configuration in which the large-diameter portion 33*b* abuts on the barrel die upper end surface 31*c*.

As illustrated in FIGS. 8 and 9, the lens 40 is configured to include an optical-functioning portion 41 made of glass and a flange portion 42 surrounding an outer side of the optical-functioning portion 41. The flange portion 42 is made of a material different from the glass of the optical-functioning portion 41, and in the embodiment, the flange portion 42 is made of metal. A softening temperature of the metal of the flange portion 42 is equal to or higher than the glass transition temperature of glass of the optical-functioning portion 41.

The flange portion 42 is prepared in advance before the optical-functioning portion 41 is press-molded using the molding die 30 and has a first flat surface 42*a* and a second flat surface 42*b* which are flat surfaces perpendicular to an optical axis Xb of the lens 40, and a cylindrical outer circumferential surface 42*c* and a cylindrical inner circumferential surface 42*d* around the optical axis Xb.

When the lens 40 is molded using the molding die 30, the flange portion 42 formed in advance is attached inside the molding die 30 as illustrated in FIG. 5. The flange portion 42 is held in a state in which the first flat surface 42*a* is placed on the flange portion holding surface 35 and the outer circumferential surface 42*c* faces the inner circumferential surface 31*a* of the barrel die 31. The first flat surface 42*a* is placed on the flange portion holding surface 35, and thereby the position of the flange portion 42 in a direction along the central axis X2 is determined. In addition, a size of an outer diameter of the outer circumferential surface 42*c* and a size of an inner diameter of the inner circumferential surface 31*a* are appropriately determined, and a position of the flange portion 42 in the direction perpendicular to the central axis X2 is determined by the outer circumferential surface 42*c* and the inner circumferential surface 31*a*.

A thickness of the flange portion 42 from the first flat surface 42*a* to the second flat surface 42*b* (thickness in the optical axis direction in a state in which the lens 40 is completely formed) is equal to or smaller than an interval between the flange portion holding surface 35 and the flange portion holding surface 37 when the lower die 32 and the upper die 33 are placed at the respective press moving ends. Hence, each of the lower die 32 and the upper die 33 can be moved to the press moving end without being hindered by the flange portion 42.

Alternatively, the thickness of the flange portion 42 before the flange portion 42 is attached inside the molding die 30 is slightly larger than the interval between the flange portion holding surface 35 and the flange portion holding surface 37 when the lower die 32 and the upper die 33 are placed at the respective press moving ends. In this case, when the lens 40 is molded using the molding die 30, the flange portion 42 is pressed by the flange portion holding surface 35 and the flange portion holding surface 37 and is deformed in the optical axis direction.

As illustrated in FIG. 6, the flange portion 42 is mounted inside the molding die 30, and a spherical glass preform PF2 made of glass serving as a base material of the optical-functioning portion 41 is placed on the lens forming surface 34 of the lower die 32. The glass preform PF2 is held at a position on the central axis X2 in the concave shape of the lens forming surface 34. The lower die 32 is held at the press moving end where the large-diameter portion 32*b* is abutted on the barrel die lower end surface 31*b*, and the lower die 32 is supported from below so that the insertion portion 32*a* is not detached from the barrel die 31. The glass preform PF2 may be supplied onto the lens forming surface 34 in a state in which the insertion portion 32*a* is pulled downward from the barrel die 31, or the glass preform may be supplied from an upper end side of the barrel die 31 in a state in which the insertion portion 32*a* is inserted into the barrel die 31. In addition, although the glass preform PF2 has a spherical shape in FIG. 6, a glass preform having a shape other than a spherical shape may be used.

The glass preform PF2 is heated and softened to have a temperature exceeding the glass transition temperature, and the upper die 33 in a state in which the insertion portion 33*a* is inserted into the barrel die 31 is pressed downward. The glass preform PF2 is pressed between the lens forming surface 36 of the lowering upper die 33 and the lens forming surface 34 of the lower die 32 which is restricted from lowering, and the glass preform PF2 is deformed.

When the upper die 33 is lowered to the press moving end illustrated in FIG. 7, the glass preform PF2 becomes the optical-functioning portion 41 having a shape corresponding to the die space S2. More specifically, since the flange portion 42 is disposed in a circumferential edge region of the die space S2, the optical-functioning portion 41 is press-molded in an inner region of the flange portion 42 in the die space S2, an outer circumferential portion of the optical-functioning portion 41 is brought into close contact with the inner circumferential surface 42*d*, and the optical-functioning portion 41 and the flange portion 42 are integrated. Accordingly, by disassembling the molding die 30 after cooling to a predetermined temperature, the molded lens 40 can be taken out.

Further, a thermal expansion coefficient of the metal of the flange portion 42 may be set to be higher than a thermal expansion coefficient of the members constituting the molding die 30, and the flange portion 42 may be disposed inside the molding die 30 with a slight clearance in a state before heating is performed to soften the glass preform PF2. In this case, the flange portion 42 expands by heating, and the flange portion 42 comes into close contact with the molding die 30 using a difference between respective thermal expansion coefficients. Specifically, due to the expansion of the flange portion 42, the outer circumferential surface 42*c* comes into close contact with the inner circumferential surface 31*a*, the first flat surface 42*a* comes into close contact with the flange portion holding surface 35, and the second flat surface 42*b* comes into close contact with the flange portion holding surface 37. The molding die 30 is configured to make the central axis X2 of the inner circumferential surface 31*a* coincide with the optical axis Xb of the molded lens 40 with high accuracy, and thereby the expanded flange portion 42 by heating uniformly comes into close contact with the inner circumferential surface 31*a*. Hence, the eccentricity accuracy with respect to the barrel die 31 is improved, and the lens 40 in which the central position of the flange portion 42 is disposed to be coaxial with the optical-functioning portion 41 with high accuracy can be obtained.

A direction along the optical axis Xb of the lens 40 is defined as an optical axis direction, and a direction perpendicular to the optical axis Xb is defined as an orthogonal direction to the optical axis. The orthogonal direction to the optical axis can also be referred to as a radial direction of the lens 40.

As described above, the lens 40 having a hybrid structure including the optical-functioning portion 41 which is a glass press-molded product and the metal flange portion 42 is formed. As illustrated in FIG. 8, the optical-functioning portion 41 of the lens 40 includes, on both sides (front and back) in the optical axis direction, a convex lens surface 43 to which a surface shape of the lens forming surface 34 is transferred and a concave lens surface 44 to which a surface shape of the lens forming surface 36 is transferred. The lens 40 of the embodiment is an aspherical lens in which the lens surface 43 and the lens surface 44 are both aspherical. Further, the lens according to the invention is not limited to the aspherical lens and can be applied to a spherical lens.

An outer circumferential region of the optical-functioning portion 41 serves as an outer circumferential surface 45 closely fixed to the inner circumferential surface 42d of the flange portion 42. The outer circumferential surface 45 is a cylindrical surface around the optical axis Xb along the inner circumferential surface 42d.

Further, an outer circumferential corner portion of the optical-functioning portion 41 has a volume absorption portion 46 and a volume absorption portion 47 for absorbing an effect of an error during molding performed by the molding die 30. The error at the time of molding is a quantity error of the glass preform PF2, a volume error of the die space S2 of the molding die 30, deviation of the supply position of the glass preform PF2 to the molding die 30, or the like.

The volume absorption portion 46 is formed by connecting a boundary region between the lens surface 43 and the outer circumferential surface 45 such that the lens surface 43 has a rounded corner shape (corner R shape) passing inside a corner shape formed when the lens surface extends in a designed lens surface shape and intersects the outer circumferential surface 45. The volume absorption portion 47 is formed by connecting a boundary region between the lens surface 44 and the outer circumferential surface 45 such that the lens surface 44 has a rounded corner shape (corner R shape) passing inside a corner shape formed when the lens surface extends in a designed lens surface shape and intersects the outer circumferential surface 45. The volume absorption portion 46 and the volume absorption portion 47 are regions that allow variations in shape due to the various errors described above. Hence, the shapes of the volume absorption portion 46 and the volume absorption portion 47 illustrated in FIG. 8 are an example, and the shapes of the volume absorption portion 46 and the volume absorption portion 47 vary depending on a degree of an error.

The volume absorption portion 46 and the volume absorption portion 47 enable an error at the time of press-molding to be prevented from affecting other regions of the optical-functioning portion 41 and enable the lens surface 43 and the lens surface 44 to be formed with high accuracy. In addition, since the volume absorption portion 46 and the volume absorption portion 47 do not have a shape that sharply protrudes or is recessed from the optical-functioning portion 41 but have a shape that smoothly connects the lens surfaces 43 and 44 and the outer circumferential surface 45, the volume absorption portion 46 and the volume absorption portion 47 are unlikely to cause cracking or breakage of the optical-functioning portion 41.

As described above, the volume absorption portion 46 and the volume absorption portion 47 can absorb an error associated with press-molding of the optical-functioning portion 41. In addition, a position reference surface for positioning the lens 40 is provided not at the optical-functioning portion 41 but at the flange portion 42. That is, in the lens 40, division of functions is performed such that the flange portion 42 has a positioning function and the optical-functioning portion 41 has an error absorption function at the time of press-molding.

Figure 10:
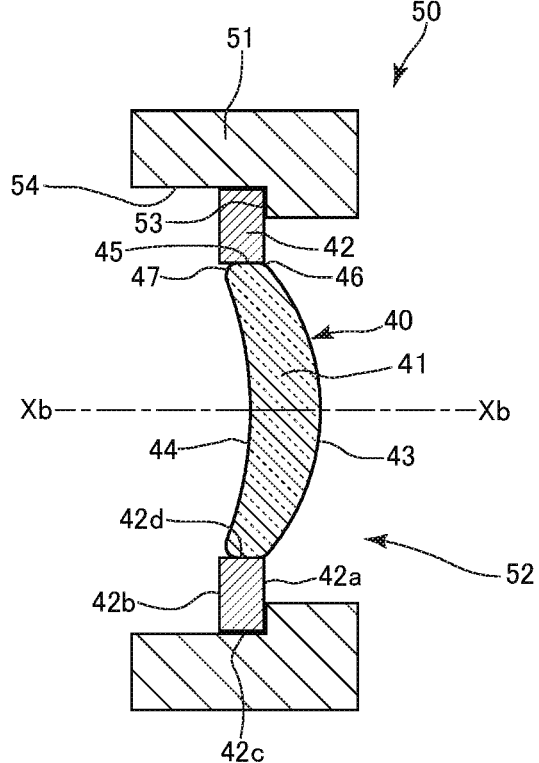
FIG. 10 is a cross-sectional view of a lens unit in which the lens of the embodiment is attached to a lens barrel.

FIG. 10 illustrates a lens unit 50 into which the lens 40 is incorporated. The lens unit 50 includes a cylindrical lens barrel 51, and a lens barrel inner space 52 penetrating in the optical axis direction is formed inside the lens barrel 51. In the lens barrel inner space 52, a position restricting surface 53 extending in the orthogonal direction to the optical axis and a cylindrical surface 54 extending in the optical axis direction from a circumferential edge of the position restricting surface 53 are formed. A size of an inner diameter of the cylindrical surface 54 is equal to or larger than the outer diameter of the outer circumferential surface 42c of the flange portion 42 (that is, a diameter of the lens 40).

The lens 40 is inserted into the lens barrel 51 from an opening end portion (end portion opposite to the position restricting surface 53) of the cylindrical surface 54 with the lens surface 43 facing forward in the insertion direction. When the first flat surface 42a of the flange portion 42 abuts on the position restricting surface 53, the insertion of the lens 40 is restricted, and the position of the lens 40 in the optical axis direction is determined. That is, the first flat surface 42a is a position reference surface that sets the position of the lens 40 in the optical axis direction. The lens 40 positioned in the optical axis direction as described above is fixed inside the lens barrel 51. The lens 40 can be fixed to the lens barrel 51 by various means. For example, the flange portion 42 can be bonded to the position restricting surface 53. Alternatively, another fixing member (not illustrated) abutting on the second flat surface 42b may be inserted into the lens barrel inner space 52 to sandwich the flange portion 42 between the position restricting surface 53 and the fixing member.

The position of the lens 40 in the lens barrel 51 in the orthogonal direction to the optical axis can be set by abutment of the outer circumferential surface 42c of the flange portion 42 on the cylindrical surface 54 of the lens barrel 51. That is, the outer circumferential surface 42c of the lens 40 can be used as the position reference surface that sets the position of the lens 40 in the orthogonal direction to the optical axis. More specifically, a dimensional relationship is set such that the outer diameter of the outer circumferential surface 42c is equal to the inner diameter of the cylindrical surface 54. Alternatively, there may be provided a configuration in which the outer diameter of the outer circumferential surface 42c is set to be slightly larger than the inner diameter of the cylindrical surface 54 so that the lens 40 is press-fitted into the lens barrel 51.

As another example, a clearance is set to enable the position in the orthogonal direction to the optical axis to be adjusted between the cylindrical surface 54 and the outer circumferential surface 42c, and then, when the lens 40 is fixed to the lens barrel 51, an alignment structure in which the position of the lens 40 is set in the orthogonal direction to the optical axis may be provided.

Unlike the lens unit 50 in FIG. 10 in which the position of the lens 40 in the optical axis direction in the lens barrel 51 is set by causing the first flat surface 42a to abut on the position restricting surface 53, it is also possible to provide a position restricting surface in the lens barrel, the position restricting surface facing a direction opposite to the position restricting surface 53 in the optical axis direction, and set the position of the lens 40 in the optical axis direction by causing the second flat surface 42b to abut on the position restricting surface. In this case, an insertion direction of the lens 40 into the lens barrel is opposite to that of the lens unit 50 in FIG. 10. In this manner, the second flat surface 42b may be a position reference surface that sets the position of the lens 40 in the optical axis direction.

In addition, in the lens unit 50 in FIG. 10, an example in which only the lens 40 is disposed in the lens barrel 51 is illustrated, but an optical system of the lens unit 50 may be configured of a plurality of lenses including the lens 40. In this case, it is also possible to perform positioning another lens in the optical axis direction which is inserted into the lens barrel 51, next to the lens 40, with the flange portion 42 as a reference (abutted on the flange portion 42).

The flange portion 42 of the lens 40 does not need to have a shape for absorbing an error at the time of lens molding such as the volume absorption portion 46 and the volume absorption portion 47 and, thus, can be configured to have a small size. That is, the flange portion 42 specialized in the positioning function can be decreased in size as compared with the flange portion 23 of the glass mold lens 20 having the volume absorption portion 24 and the volume absorption portion 25. In particular, in the flange portion 23 of the glass mold lens 20, the thickness corresponding to the volume absorption portion 24 and the volume absorption portion 25 is required on both sides of the outer circumferential surface 23c in the optical axis direction, and the decrease in size is restricted (see FIG. 4). On the other hand, in the flange portion 42 of the lens 40, since there is no need to provide a redundant thickness on both sides of the outer circumferential surface 42c in the optical axis direction, it is easy to reduce the thickness of the flange portion 42 in the optical axis direction. For example, when the outer circumferential surface 23c and the outer circumferential surface 42c have the same length in the optical axis direction, the flange portion 42 has a smaller thickness in the optical axis direction than the flange portion 23.

Hence, in order to obtain equivalent positional accuracy and stability between the glass mold lens 20 and the lens 40, the flange portion 42 of the lens 40 can be made thinner in the optical axis direction than the flange portion 23 of the glass mold lens 20.

Since the flange portion 42 has a simple annular (cylindrical) shape, the first flat surface 42a, the second flat surface 42b, the outer circumferential surface 42c, and the inner circumferential surface 42d can be easily formed with high accuracy. In addition, the metal flange portion 42 can easily achieve a decrease in thickness to the extent that it is difficult to perform processing on the glass flange portion 23 integrally formed with the glass mold lens 20. In addition, since the shape of the metal flange portion 42 can be restored by elastic deformation with respect to a certain degree of external force, there is little risk that cracking or unrecoverable deformation will occur even if the flange portion 42 has a thin thickness.

Moreover, since the metal flange portion 42 does not have optical transparency, it is possible to obtain a light shielding effect of shielding harmful light passing through the outside of the lens surfaces 43 and 44 in the lens 40. For example, in the glass mold lens 20 in FIG. 4, since the flange portion 23 has optical transparency, it is necessary to apply light shielding coating or to attach a light shielding member to the flange portion 23. On the other hand, in the lens 40, since the flange portion 42 itself has a light shielding property, there is an advantage that such labor is not required.

Figure 14:
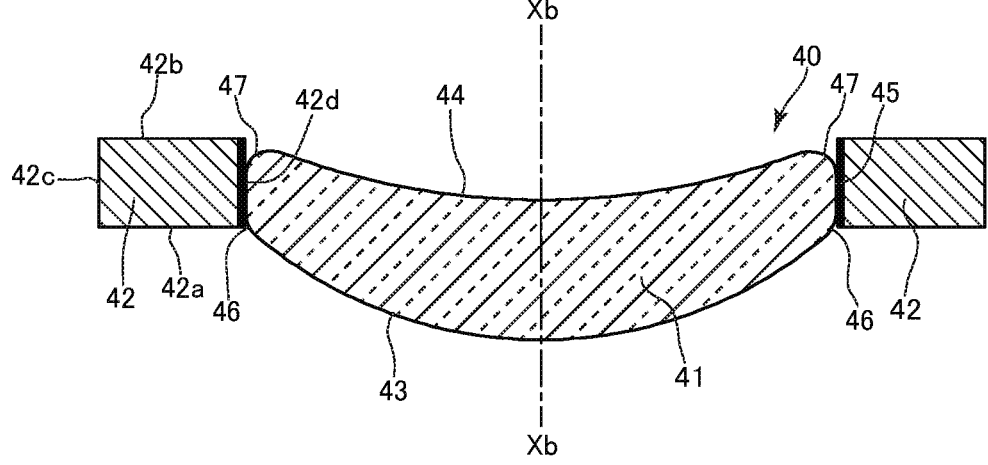
FIG. 14 is a cross-sectional view illustrating a lens having an inner circumferential surface of a flange portion, the inner circumferential surface being subjected to a blackening treatment.
Figure 15:
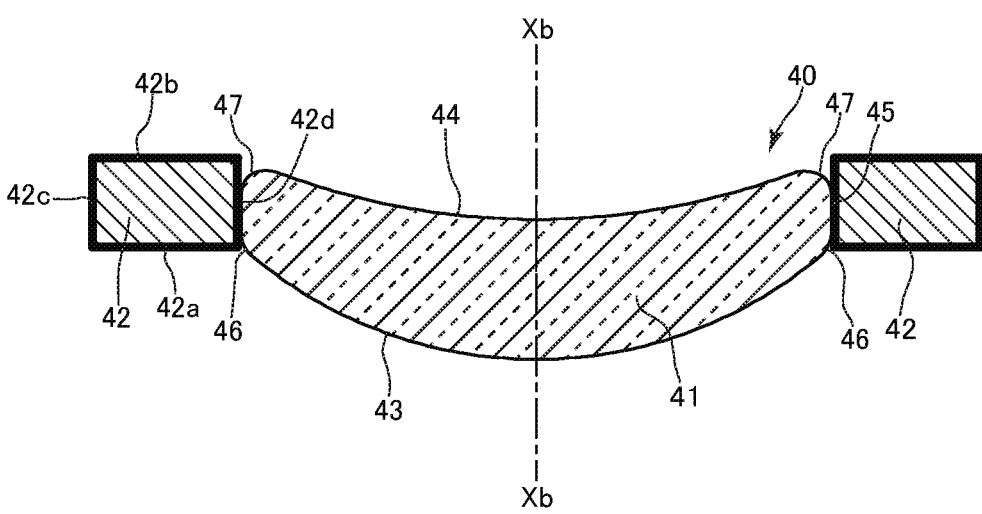
FIG. 15 is a cross-sectional view illustrating a lens having an outer surface of a flange portion, the entire outer surface being subjected to a blackening treatment.

Further, a blackening treatment for suppressing reflection of light may be performed on an outer surface of the flange portion 42 in order to enhance the light shielding property by the flange portion 42. The outer surface of the flange portion 42 is a region where the flange portion 42 appears in an external appearance in a single state (state before being combined with the optical-functioning portion 41), and the outer surface of the flange portion 42 also includes the inner circumferential surface 42d fixed to the outer circumferential surface 45 of the optical-functioning portion 41 in a state in which the lens 40 is completely formed. The blackening treatment of the outer surface is processing for reducing reflection of light by preventing a color and gloss of metal (base metal), which is a material of the flange portion 42, from being directly exposed to the outer surface. Note that, the blackening treatment is not limited to complete blackening of the outer surface of the flange portion 42, and it is sufficient that the blackening treatment exhibits a predetermined reflection reducing effect or higher as compared with the case where the base metal of the flange portion 42 is exposed. In FIGS. 14 and 15, a portion where the blackening treatment is performed on the outer surface of the flange portion 42 is represented by a bold line.

FIG. 14 illustrates an example in which the blackening treatment is performed on the inner circumferential surface 42d of the flange portion 42. The blackening treatment performed on the inner circumferential surface 42d constituting the inner surface on an optical path which surrounds the optical-functioning portion 41 enables inner surface reflection to be suppressed on the inner circumferential surface 42d and enables the optical performance of the lens 40 to be improved.

FIG. 15 illustrates an example in which the blackening treatment is performed on the entire outer surface of the flange portion 42, and the blackening treatment is performed on the first flat surface 42a, the second flat surface 42b, the outer circumferential surface 42c, the inner circumferential surface 42d, and boundary regions of these surfaces. That is, the entire flange portion 42 has a configuration in which a region (base metal) which is not blackened is not exposed to the outer surface. In the flange portion 42 having a thin thickness in the optical axis direction, the entire outer surface may be blackened in this manner in order to enhance the effect of suppressing harmful stray light.

In addition, when the lens 40 is incorporated into the lens barrel 51 as illustrated in FIG. 10, it is also possible to select that the first flat surface 42a, the second flat surface 42b, and the inner circumferential surface 42d are blackened and the outer circumferential surface 42c is not blackened, in a case where the outer circumferential surface 42c of the flange portion 42 and the cylindrical surface 54 of the lens barrel 51 are in close contact with each other and light does not enter the portion of the outer circumferential surface 42c.

It is difficult to perform the blackening treatment on the inner circumferential surface 42d of the flange portion 42 after the optical-functioning portion 41 and the flange portion 42 are coupled to each other. Therefore, the inner circumferential surface 42d may be blackened at a stage before the optical-functioning portion 41 is press-molded using the molding die 30, that is, in a state in which the flange portion 42 is a single portion.

The blackening treatment can be performed on the first flat surface 42a, the second flat surface 42b, and the outer circumferential surface 42c of the flange portion 42 even after the optical-functioning portion 41 and the flange portion 42 are coupled to each other. Hence, the first flat surface 42a, the second flat surface 42b, and the outer circumferential surface 42c may be blackened before the optical-functioning portion 41 is press-molded by the molding die 30, or may be blackened after the press-molding.

As a method of blackening the outer surface of the flange portion 42, for example, oxidation of metal by performing heating, a chemical conversion treatment, a plating process, and the like can be applied. The oxidation of the metal by performing heating oxidizes the outer surface of the flange portion 42 by performing heating in an atmosphere containing oxygen to eliminate metallic luster and blacken the outer surface. As an example of the chemical conversion treatment, the flange portion 42 is immersed in an alkaline aqueous solution to form a black oxide film (triiron tetraoxide coating) on the outer surface of the flange portion 42. As an example of the plating process, plating such as black nickel plating or black chromium plating is performed on the outer surface of the flange portion 42. In addition, since heat resistance condition is relaxed without heating to soften the optical-functioning portion 41 after the press-molding of the optical-functioning portion 41 by the molding die 30, it is also possible to use a method of applying a black synthetic resin coating material or the like in the blackening treatment after the press-molding.

As illustrated in FIG. 9, an information display portion 48 may be provided at the flange portion 42. As an example of the information display portion 48, a reference mark indicating an orientation of the lens 40 in a circumferential direction, a product serial number, a two-dimensional code including information such as specifications of the lens 40, and the like can be applied. The metal flange portion 42 is easy to provide the information display portion 48 and to enhance the visibility of the information display portion 48 as compared with the glass flange portion. Further, a position where the information display portion 48 is provided is preferably the first flat surface 42a or the second flat surface 42b, and the information display portion 48 may be provided at the outer circumferential surface 42c.

The optical-functioning portion 41 of the lens 40 does not have the positioning function of the lens 40 and has a structure in which the lens surface 43 and the lens surface 44 functioning as optical surfaces are connected in a simple outer circumferential shape (the outer circumferential surface 45, the volume absorption portion 46, and the volume absorption portion 47). Therefore, in the optical-functioning portion 41, there is no thin protruding portion such as the flange portion 23 in the glass mold lens 20 in FIG. 4, and there is no portion where an angle of a surface sharply changes like the boundary between the lens surface 21 and the first flat surface 23a in the glass mold lens 20, and the risk of cracking or breakage is suppressed as compared with the glass mold lens 20. Hence, the optical-functioning portion 41 is superior to the glass mold lens 20 in terms of strength.

In addition, the die space S2 for forming the optical-functioning portion 41 in the molding die 30 is surrounded by the flange portion 42 on the outer circumferential side, and it is not necessary to extend the glass preform PF2 to a narrow space on the outer circumferential side of the die space S2 at the time of molding. Therefore, extension of the glass preform PF2 in an optical effective area (the lens surface 43 and the lens surface 44 formed by the lens forming surface 34 and the lens forming surface 36) which has to have high quality in appearance and surface accuracy can be realized at a relatively low temperature (value close to the glass transition temperature of the glass preform PF2). Hence, an advantage in terms of improvement in quality of appearance and surface accuracy in the optical-functioning portion 41 is achieved.

Moreover, since the optical-functioning portion 41 does not have a portion that is easily cracked like the flange portion 23, there is no need to take measures such as formation of a release film for suppressing cracking and a special surface treatment of the glass preform PF2 (or measures can be reduced), when the optical-functioning portion 41 is molded by the molding die 30. As a result, opaqueness or destabilization of the surface accuracy of the outer surface of the optical-functioning portion 41 due to the release film or the surface treatment does not occur. In this respect, an advantage in terms of improvement in quality of the appearance and the surface accuracy in the optical-functioning portion 41 is achieved.

The lens surface 21 and the lens surface 22 of the glass mold lens 20 in FIG. 4 and the lens surface 43 and the lens surface 44 of the lens 40 in FIG. 8 have substantially the same design shape; however, as can be found from the comparison between FIGS. 2 and 6, the glass preform PF2 used for forming the optical-functioning portion 41 of the lens 40 is smaller than the glass preform PF1 used for forming the glass mold lens 20. In addition, since the small amount of the glass preform PF2 forms a spherical body having a radius of curvature smaller than that of the glass preform PF1, the risk of the gas trap at the time of pressing is reduced when the lens surface 43 and the lens surface 44 of the lens 40 are formed from the glass preform PF2, rather than when the lens surface 21 and the lens surface 22 of the glass mold lens 20 are formed from the glass preform PF1. In addition, by using the glass preform PF2 smaller than the glass preform PF1, the degree of freedom of the lens design shape can be increased.

As described above, since the lens 40 of the embodiment is configured by combining the optical-functioning portion 41 made of glass and the flange portion 42 made of a material (metal) different from glass of the optical-functioning portion 41, it is possible to achieve both the securing of the high optical performance and the strength in the optical-functioning portion 41 and the decrease in size (decrease in thickness in the optical axis direction) of the flange portion 42, and various advantages can be obtained as compared with the glass mold lens 20 illustrated as a comparison target.

More specifically, the lens 40 preferably satisfies the following conditions. First, it is assumed that only the flange portion 42 has a function of setting the position of the lens 40 with respect to a holding member such as the lens barrel 51 of the lens unit 50. Specifically, the flange portion 42 includes the first flat surface 42a and the second flat surface 42b that can support positioning in the optical axis direction and an outer circumferential surface 42c that can support positioning in the orthogonal direction to the optical axis.

The optical-functioning portion 41 includes only a region including the lens surface 43 and the lens surface 44 which are optically functioning regions, the outer circumferential surface 45 fixed to the flange portion 42, and the volume absorption portion 46 and the volume absorption portion 47 for absorbing an error during press-molding of the optical-functioning portion 41, and the optical-functioning portion 41 does not have a function of setting the position of the lens 40 with respect to the holding member such as the lens barrel 51. As a shape condition of the optical-functioning portion 41, neither the function of simply setting the lens position nor a surface orthogonal to the optical axis such as the first flat surface 42a and the second flat surface 42b of the flange portion 42 is provided. That is, the optical-functioning portion 41 does not include any shape similar to the flange portion of the existing glass mold lens.

As illustrated in FIG. 8, a diameter of the entire lens 40 defined by the outer circumferential surface 42c of the flange portion 42 is defined as an outer diameter D. A diameter of the optical-functioning portion 41 defined by the inner circumferential surface 42d of the flange portion 42 (the outer circumferential surface 45 of the optical-functioning portion 41) is defined as a surface diameter d. A diameter (diameter of optically effective lens surfaces 43 and 44) of a region of the optical-functioning portion 41 excluding a radial region where the volume absorption portion 46 and the volume absorption portion 47 are formed is defined as an effective diameter e. A dimension of the radial region in the orthogonal direction to the optical axis where the volume absorption portion 46 and the volume absorption portion 47 are formed is defined as an error absorption width R. In addition, the thickness of the flange portion 42 in the optical axis direction (a distance from the first flat surface 42$a$ to the second flat surface 42$b$) is defined as a flange thickness t.

It is desirable that the outer diameter D and the flange thickness t satisfy the following condition (1) or (2).

$$\text{when } 2 \text{ mm} \leq D \leq 5 \text{ mm}, 0.15 \leq t \leq 0.35 \tag{1}$$

$$\text{when } D > 5 \text{ mm}, 0.15 + (D-5) \times 0.03 \leq t \leq 0.15 + (D-5) \times 0.07 \tag{2}$$

Conditions (1) and (2) indicate a range of an appropriate thickness of the flange portion 42 in the optical axis direction with respect to the diameter of the lens 40. When the thickness is smaller than the lower limit value of the conditions (1) and (2), there is a possibility that the positioning accuracy and the holding stability of the lens 40, the strength of the flange portion 42, and the like are affected.

When the thickness exceeds the upper limit values of the conditions (1) and (2), the flange portion 42 becomes thick in the optical axis direction and does not satisfy the demand for the decrease in thickness. For example, when the flange thickness t is too large, a space in the optical axis direction which is occupied by the flange portion 42 becomes too large, and the lens unit 50 may be increased in size, in a case where the lens unit 50 is incorporated into the lens barrel 51.

In this manner, by satisfying the conditions (1) and (2), the strength and accuracy of the flange portion 42 can be secured, and the flange portion 42 can be decreased in thickness. In other words, by employing the lens 40 including the optical-functioning portion 41 and the flange portion 42, it is possible to satisfy the conditions (1) and (2) without difficulty.

In the glass mold lens 20 (FIG. 4) having the lens surfaces 21 and 22 having the same shapes as the lens surfaces 43 and 44 of the lens 40, when the flange portion 23 is formed to have a thickness within a range of a thickness corresponding to the conditions (1) and (2), a probability of the occurrence of a crack or a shape defect in or around the flange portion 23 increases, or a probability of a decrease in positioning accuracy of the lens via the flange portion 23 increases.

As described above, by employing the configuration of the lens 40 of the embodiment and satisfying the condition (1) or (2), it is possible to decrease the thickness of the flange portion 42 (lens holding portion) as compared with the glass mold lens in the related art, without impairing the optical performance.

Further, as an additional condition different from the above conditions (1) and (2), the upper limit value of the flange thickness t of the lens 40 is preferably 40% or less of the outer diameter D from the viewpoint of the operation accuracy and stability of the molding die 30 at the time of press-molding. When the flange portion 42 has a thickness exceeding the upper limit value, a fitting length between the insertion portion 33$a$ of the upper die 33 and the inner circumferential surface 31$a$ of the barrel die 31 and a fitting length between the insertion portion 32$a$ of the lower die 32 and the inner circumferential surface 31$a$ of the barrel die 31 decrease when the flange portion 42 is disposed inside the molding die 30, and the risk of inclination of the upper die 33 and the lower die 32 with respect to the central axis X2 during the press-molding increases. In particular, as the outer diameter D of the lens 40 is smaller, each part of the molding die 30 becomes smaller, and thus the tendency thereof becomes stronger. Hence, by setting the flange thickness t to be equal to or less than the upper limit value, it is possible to secure the fitting length of each part of the molding die 30 and to obtain the effect of improving the processing accuracy of the press-molding.

In addition, it is desirable that the surface diameter d and the effective diameter e of the optical-functioning portion 41 of the lens 40 satisfy any one of the following conditions (3), (4), (5), and (6).

$$(d-e) \leq 0.5 \text{ mm when } 2 \text{ mm} \leq e \leq 5 \text{ mm} \tag{3}$$

$$(d-e) \leq 0.7 \text{ mm when } 5 \text{ mm} < e \leq 10 \text{ mm} \tag{4}$$

$$(d-e) \leq 0.9 \text{ mm when } 10 \text{ mm} < e \leq 15 \text{ mm} \tag{5}$$

$$(d-e) \leq 1.1 \text{ mm when } 15 \text{ mm} < e \leq 20 \text{ mm} \tag{6}$$

The conditions (3), (4), (5), and (6) indicate appropriate values of the difference between the surface diameter d and the effective diameter e in the optical-functioning portion 41. By satisfying any one of the conditions (3), (4), (5), and (6), a volume error in a range assumed when the optical-functioning portion 41 having a predetermined effective diameter e is press-molded can be reliably absorbed by the volume absorption portion 46 and the volume absorption portion 47, and the optical-functioning portion 41 including the lens surface 43 and the lens surface 44 with high accuracy and appearance quality can be formed without causing molding defects.

Further, as illustrated in FIG. 8, the difference between the surface diameter d and the effective diameter e in the lens 40 is substantially equal to the error absorption width R×2. Accordingly, the error absorption width R and the outer diameter D desirably satisfy any one of the following conditions (7), (8), (9), and (10).

$$R \leq 0.23 \text{ mm when } 2 \text{ mm} \leq D \leq 5 \text{ mm} \tag{7}$$

$$R \leq 0.35 \text{ mm when } 5 \text{ mm} < D \leq 10 \text{ mm} \tag{8}$$

$$R \leq 0.45 \text{ mm when } 10 \text{ mm} < D \leq 15 \text{ mm} \tag{9}$$

$$R \leq 0.55 \text{ mm when } 15 \text{ mm} < D \leq 20 \text{ mm} \tag{10}$$

The dimension of the flange portion 42 in the orthogonal direction to the optical axis (flange width w illustrated in FIG. 8) is obtained by (D−d)/2. In the lens 40 of the embodiment, it is possible to obtain a high degree of freedom in the dimensional relationship between the flange width w and the flange thickness t while decreasing the thickness of the flange portion 42. However, by satisfying the following condition (11), a decrease in weight of the lens 40 and improvement in stability of the posture of the lens 40 when being incorporated into the lens barrel 51 are easily achieved.

$$0.5 \leq \{(D-d)/2\}/t \leq 30 \tag{11}$$

The lower limit value of $\{(D-d)/2\}/t$ within a range of the condition (11) is preferably 1.0, more preferably 1.5, and still more preferably 2.0. In addition, the upper limit value of $\{(D-d)/2\}/t$ within the range of the condition (11) is preferably 20, more preferably 10, and still more preferably 5.

In the lens 40 of the above-described embodiment, the material of the flange portion 42 is metal, but it is also possible to select a material other than metal as the material of the flange portion of the lens to which the invention is applied. For example, the flange portion may be formed of glass different from the glass of the optical-functioning portion. In this case, the glass may be selected such that the glass transition temperature of the glass of the flange portion is higher than the glass transition temperature of the glass of the optical-functioning portion.

Alternatively, the flange portion may be made of ceramics. In this case, it is preferable that a thermal expansion coefficient of the ceramic of the flange portion exceeds a thermal expansion coefficient of a member constituting the molding die. Consequently, when the optical-functioning portion of the lens is molded, the flange portion made of ceramics expands and comes into close contact with the molding die, the eccentricity accuracy with respect to the barrel die is improved, and the lens in which the flange portion and the optical-functioning portion are coaxially disposed with high accuracy can be obtained.

The lens to which the invention is applied has an advantage that the degree of freedom of the shape of the flange portion can be increased without affecting the optical performance and productivity of the optical-functioning portion. Therefore, it is also possible to apply a flange portion having a shape different from that of the flange portion 42 in the lens 40 of the above-described embodiment.

For example, the flange portion 42 of the above-described embodiment is the first flat surface 42a and the second flat surface 42b in which the surfaces on both sides in the optical axis direction are parallel to each other, but a recess or a notch may be present in a part of the first flat surface 42a or the second flat surface 42b. In addition, in the flange portion 42 of the above-described embodiment, the outer circumferential surface 42c and the inner circumferential surface 42d are continuous in the entire circumferential direction around the optical axis Xb, but a recess or a notch may be present in the middle of the outer circumferential surface 42c and the inner circumferential surface 42d. In these cases, the outer diameter of the lens 40 and the dimension of the flange portion 42 are defined with reference to a remaining portion of each surface of the flange portion 42 excluding the recess and the notch.

Subsequently, lenses 60, 70, and 80 according to modification examples to which the invention is applied will be described with reference to FIGS. 11 to 13. In the lenses 60, 70, and 80 in FIGS. 11 to 13, regions common to those of the lens 40 of the above-described embodiment are denoted by the same reference numerals, and the description thereof is omitted. Further, in the lenses 60, 70, and 80, even in a case where dimensions, shapes, and the like are different from those of each portion of the lens 40, a region having commonality in function and configuration is treated as a region common to the lens 40.

Figure 11:
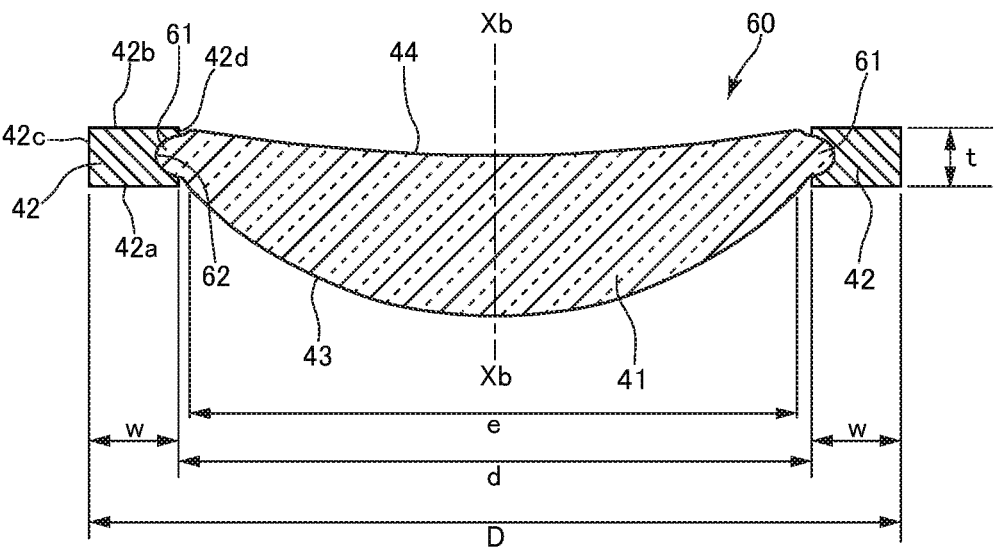
FIG. 11 is a cross-sectional view illustrating a modification example of the lens.

The lens 60 illustrated in FIG. 11 has a volume absorption portion 61 protruding outward in the radial direction on the outer circumferential surface of the optical-functioning portion 41. The volume absorption portion 61 is an annular protruding portion continuous in the circumferential direction around the optical axis Xb.

A recessed portion 62 capable of accommodating the volume absorption portion 61 is formed on an inner circumferential portion of the flange portion 42 of the lens 60. The recessed portion 62 is an annular recess continuous in the circumferential direction around the optical axis Xb and has a shape recessed into the inner circumferential surface 42d of the flange portion 42.

The lens 60 is set such that a shape of the volume absorption portion 61 on a cross section including the optical axis Xb is a convex curved shape (corner R shape) such as a combination of the volume absorption portion 46 and the volume absorption portion 47 in the lens 40 of the above-described embodiment. A role of the volume absorption portion 61 is the same as that of the volume absorption portion 46 and the volume absorption portion 47 in the lens 40 of the above-described embodiment, and various errors in forming the lens 60 by press-molding are absorbed by the volume change of the volume absorption portion 61. The recessed portion 62 is set to have a shape and a size to be capable of accommodating the volume absorption portion 61 when the volume of the volume absorption portion 61 is an allowable maximum value.

Figure 12:
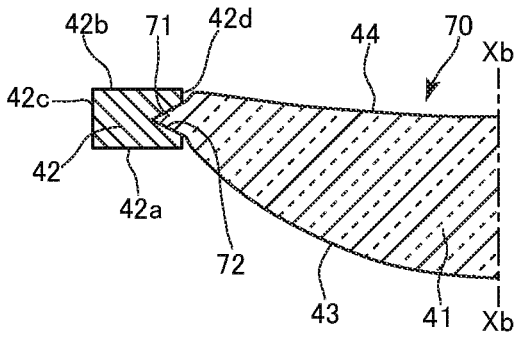
FIG. 12 is a cross-sectional view illustrating another modification example of the lens.

The lens 70 illustrated in FIG. 12 has the same basic configuration as the lens 60 and is different in that a shape of a volume absorption portion 71 on the cross section including the optical axis Xb is set to a wedge-like shape (triangular shape). A recessed portion 72 capable of accommodating the volume absorption portion 71 is formed at an inner circumferential portion of the flange portion 42 of the lens 70.

Figure 13:
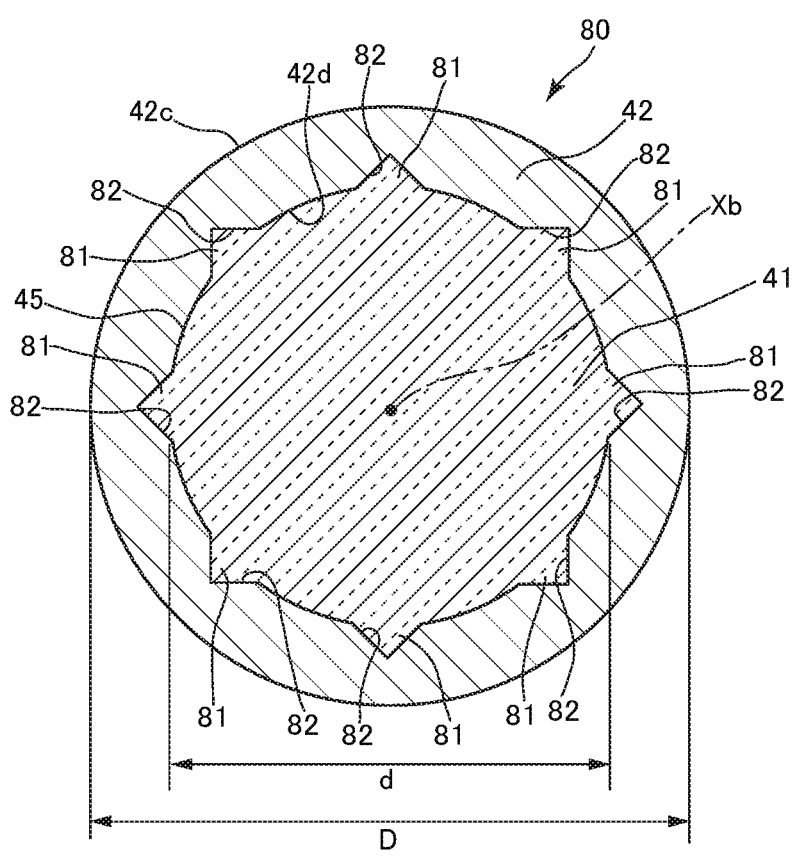
FIG. 13 is a cross-sectional view illustrating still another modification example of the lens.

In the lens 80 illustrated in FIG. 13, volume absorption portions 81 provided on the outer circumferential surface of the optical-functioning portion 41 are not continuous in the circumferential direction around the optical axis Xb and are intermittently arranged at predetermined intervals in the circumferential direction. Correspondingly, recessed portions 82 capable of accommodating the volume absorption portions 81 are intermittently arranged at predetermined intervals in the circumferential direction at the inner circumferential portion of the flange portion 42 of the lens 80.

Further, in the lens 80, the eight volume absorption portions 81 and the eight recessed portions 82 are arranged at substantially equal intervals in the circumferential direction, but the number and interval of the volume absorption portions and the recessed portions intermittently arranged are not limited thereto.

The lenses 60, 70, and 80 of the respective modification examples all satisfy the above conditions (1), (2), and (11).

In addition, the lenses 60, 70, and 80 of the respective modification examples have volume absorption portions 61, 71, and 81 on the outer circumferential surface of the regions around the lens surfaces 43 and 44 in the optical-functioning portion 41, and the volume absorption portions 61, 71, and 81 enter the recessed portions 62, 72, and 82 of the flange portion 42, respectively. Therefore, it is possible to obtain an effect of reducing the difference between the surface diameter d of the optical-functioning portion 41 defined by the position of the inner circumferential surface 42d of the flange portion 42 and the effective diameter e (diameter of optically effective lens surfaces 43 and 44) of the lens surfaces 43 and 44.

In addition, since the lenses 60, 70, and 80 of the respective modification examples each have an uneven shape such as the recessed portions 62, 72, and 82 at the inner circumferential portion of the flange portion 42, an effect of improving the coupling strength with the optical-functioning portion 41 can be obtained.

The embodiments of the invention are not limited to the above-described embodiments and the modification examples thereof, and various changes, substitutions, and modifications may be made without departing from the spirit of the technical idea of the invention. Moreover, when the technical idea of the invention can be realized in another manner by the progress of the technology or another derived technology, the technical idea may be implemented by using the method. Hence, the claims cover all embodiments that may be included within the scope of the technical idea of the invention.

What is claimed is:

1. A lens comprising:

an optical-functioning portion that is a press-molded product made of glass, has lens surfaces on both sides in an optical axis direction, and has a volume absorption portion that allows a shape error due to press-molding around the lens surfaces; and a flange portion made of a material different from the glass of the optical-functioning portion, fixed to an outer circumferential surface of the optical-functioning portion to surround an outer side of the volume absorption portion, and having a position reference surface serving as a reference of a lens position, wherein an outer diameter D in an orthogonal direction to the optical axis defined by an outer circumferential surface of the flange portion and a thickness t in the optical axis direction of the flange portion satisfy the following condition (2):

$$\text{when } D>5 \text{ mm, } 0.15+(D-5)\times0.03 \leq t \leq 0.15+(D-5)\times 0.07. \tag{2}$$

2. The lens according to claim 1, wherein the flange portion is made of metal.

3. The lens according to claim 1, wherein the position reference surface is a flat surface perpendicular to the optical axis.

4. The lens according to claim 1, wherein the volume absorption portion is positioned between the lens surfaces of the optical-functioning portion and the outer circumferential surface of the optical-functioning portion in an orthogonal direction to the optical axis.

5. The lens according to claim 1, wherein the volume absorption portion is provided on the outer circumferential surface of the optical-functioning portion, and the flange portion has a recessed portion capable of accommodating the volume absorption portion in an inner circumferential portion.

6. The lens according to claim 1, wherein the flange portion has an inner circumferential surface which is subjected to a blackening treatment, the inner circumferential surface being fixed to the outer circumferential surface of the optical-functioning portion.

7. The lens according to claim 1, wherein the flange portion has an outer surface which is entirely subjected to a blackening treatment.

8. The lens according to claim 1, wherein the upper limit value of the thickness t of the flange portion is 40% or less of the outer diameter D.

9. The lens according to claim 1, wherein a surface diameter d of the optical-functioning portion defined by an inner circumferential surface of the flange portion, and an effective diameter e that is a diameter of a region of the optical-functioning portion excluding a radial region where the volume absorption portion is formed satisfy any one of the following conditions (3), (4), (5), and (6):

$$(d-e)\leq0.5 \text{ mm when } 2 \text{ mm}\leq e\leq5 \text{ mm} \tag{3}$$

$$(d-e)\leq0.7 \text{ mm when } 5 \text{ mm}<e\leq10 \text{ mm} \tag{4}$$

$$(d-e)\leq0.9 \text{ mm when } 10 \text{ mm}<e\leq15 \text{ mm} \tag{5}$$

$$(d-e)\leq1.1 \text{ mm when } 15 \text{ mm}<e\leq20 \text{ mm} \tag{6}$$

10. The lens according to claim 1, wherein an error absorption width R that is a dimension of the radial region in the orthogonal direction to the optical axis where the volume absorption portion is formed, and the outer diameter D satisfy any one of the following conditions (8), (9), and (10):

$$R\leq0.35 \text{ mm when } 5 \text{ mm}<D\leq10 \text{ mm} \tag{8}$$

$$R\leq0.45 \text{ mm when } 10 \text{ mm}<D\leq15 \text{ mm} \tag{9}$$

$$R\leq0.55 \text{ mm when } 15 \text{ mm}<D\leq20 \text{ mm} \tag{10}$$

11. The lens according to claim 1, wherein the outer diameter D, the thickness t of the flange portion and a surface diameter d of the optical-functioning portion defined by an inner circumferential surface of the flange portion satisfy the following condition (11):

$$0.5\leq\{(D-d)/2\}/t\leq30. \tag{11}$$

12. A lens unit including the lens according to claim 1, the lens unit comprising:

a lens barrel into which the lens is insertable, wherein the lens is positioned in the lens barrel by abutment between the position reference surface of the lens and a position restricting surface in the lens barrel.

* * * * *